US006326474B1

(12) United States Patent
Oh et al.

(10) Patent No.: US 6,326,474 B1
(45) Date of Patent: Dec. 4, 2001

(54) REACTIVE BLACK DYES CONTAINING ACETOXYETHYL SULFONE MOIETY

(75) Inventors: Sea Wha Oh; Myeong Nyeo Kang; Seung Rim Shin; Tae Kyung Kim; Sung Nyung Yun, all of Daejeon (KR)

(73) Assignee: Korea Research Institute of Chemical Technology (KR)

( * ) Notice: Subject to any disclaimer, the term of this patent is extended or adjusted under 35 U.S.C. 154(b) by 0 days.

(21) Appl. No.: 09/646,938

(22) PCT Filed: Mar. 26, 1998

(86) PCT No.: PCT/KR99/00144

§ 371 Date: Nov. 20, 2000

§ 102(e) Date: Nov. 20, 2000

(87) PCT Pub. No.: WO99/48986

PCT Pub. Date: Sep. 30, 1999

(30) Foreign Application Priority Data

Mar. 26, 1998 (KR) ..... 98/10606

(51) Int. Cl.$^{7}$ ..... C09B 62/513

(52) U.S. Cl. ..... 534/582; 534/642

(58) Field of Search ..... 534/582, 642

(56) References Cited

U.S. PATENT DOCUMENTS 4,257,770 * 3/1981 Nishimura et al. ..... 8/549

FOREIGN PATENT DOCUMENTS 29 29 107 1/1980 (DE) .
30 25 572 A1 2/1982 (DE) .
0122600 * 10/1984 (EP) .
149 170 A1 7/1985 (EP) .
56-22354 * 3/1981 (JP) .
08-122354 5/1996 (JP) .

OTHER PUBLICATIONS

Chemical Abstracts 95:44722, 1981.*

* cited by examiner

*Primary Examiner*—Fiona T. Powers
(74) *Attorney, Agent, or Firm*—Finnegan, Henderson, Farabow, Garrett & Dunner, L.L.P.

(57) ABSTRACT

This invention relates to a reactive black dye containing acetoxyethyl sulfone compound and more particularly, to the reactive black dye containing acetoxyethyl sulfone compound of formula (1), which is characterized by lessening the loss of dyes in filtering process owing to the low solubility by introducing the aminophenyl-beta-acetoxyethyl sulfone moiety, saving the cost for waste water treatment by using a small amount of salt in salting-out process and furthermore obtaining bright color with high dyeing yield and good substantivity wherein M is an alkali metal atom, and wherein the compound of formula (1) is chosen from (1)

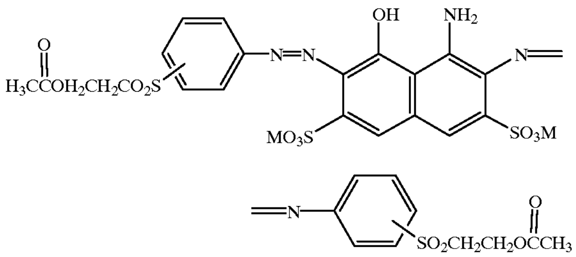

2 Claims, No Drawings

REACTIVE BLACK DYES CONTAINING ACETOXYETHYL SULFONE MOIETY

The application is a 371 of PCT/KR 99/00144 Mar. 26, 1999.

BACKGROUND OF THE INVENTION

1. Field of the Invention

This invention relates to a reactive black dye containing acetoxyethyl sulfone moiety and more particularly, to the reactive black dye containing acetoxyethyl sulfone moiety of the following formula 1, which is characterized by lessening the loss of dyes in filtering process owing to the low solubility by introducing the aminophenyl-β-acetoxyethyl sulfone moiety, saving the cost for waste water treatment by using a small amount of salt in salting-out process and furthermore obtaining bright color with high dyeing yield and good substantivity:

Formula 1

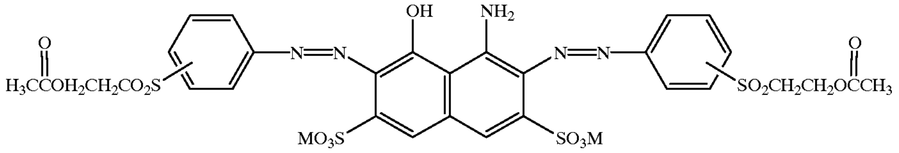

wherein M is an alkaline metal atom.

2. Description of the Related Art

Conventionally, salting-out method has been adapted in order to isolate dyes from reaction mixture after synthesizing the reactive dyes. However, if aminophenyl-β-sulphatoethylsulfone is used as an intermediate in the course of manufacturing vinylsulfone-based reactive dyes, spray-dry method is adapted or large amount of salts is used because high water-solubility of dyes hinder the salting out. The isolation of dyes by spray-drying or by using large amount of salts may cause environmental pollution with waste water containing a good deal dyes and salts and eventually require much expenses on sewage treatment.

Especially, reactive black aminophenyl-β-sulphatoethylsulfone group has problems such as putting a reddish hue and lowering its substantivity because of high water-solubility.

Recently, in some developed countries such as European countries and U. S. A., there is restriction on salt concentration in dye waterwaste, thus continuous studies have been conducted in order to obtain low-salt dye and succeeded in marketing. In addition, the liquid dyes are used more favorably because they can be exactly measured and from which the automatization of dyeing process and the promotion of worker's health can be achieved. Therefore, the highly concentrated dyes by removal of salts are required for the manufacture of the stable liquid dyes.

Therefore, in comparison with dyes synthesized with aminophenyl-β-sulphatoethylsulfone group, salting-out is generally easier in the dyes synthesized with aminophenyl-β-acetoxyethylsulfone group of following formula 2, which has relatively low water solubility:

Formula 2

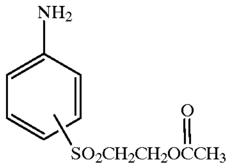

In synthesizing process of dyes with using aminophenyl-β-acetoxyethylsulfone group of the above formula 2, it is possible to lower the concentration of salt in water waste because only a small amount of salt is used in salting-out process than the conventional dyes. Also, it is cost-effective in sewage treatment because only a small amount of dyes is lost during the filtering owing to low solubility of dyes. Furthermore, thus prepared dyes has a high purity containing a small amount of salt and be able to lower the concentration of salt and make it easier desalting process in manufacturing liquid dyes.

The composition of the above formula 2 is already known and its manufacturing method is also disclosed in various documents. Among the method, one preparation method of 4-aminophenyl-β-acetoxyethylsulfone is expressed in the following Scheme1(Japanese unexamined publication Sho 81-22354; German Patent No 2 929 107):

Scheme 1

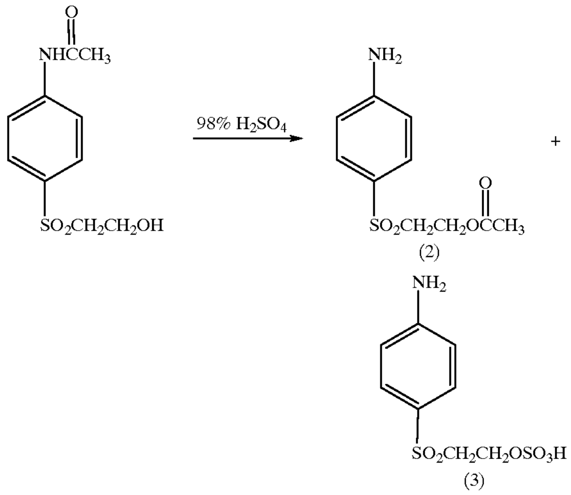

According to the above Scheme1, 4acetaminophenyl-β-hydroxyethylsulfone and 98% of sulfuric acid is reacted to get a mixture of 70% of above formula 2 and 30% of above formula 3, and it is reported that the dyes synthesized with the mixture shows good dyeing properties. However, it has a problem that the substantivity is lowered because of high water-solubility due to the existence of 4-aminophenyl-β-sulphatoethylsulfone.

But no report has been made on synthesizing reactive black dyes introducing aminophenyl-β-acetoxyethylsulfone group of the above formula 2.

SUMMARY OF THE INVENTION

As a result of continuous studies in order to prepare reactive black dyes of high yield rate and high purity, the inventors completed this invention by synthesizing a reactive black dye introducing aminophenyl-β-ethoxyethylsulfone as a reactant.

Therefore, the object of this invention is to provide a reactive black dye of high brilliance, low degree of water-solubility and fixation, having acetoxyethylsulfone group, which decrease the amount of pollutant in process for manufacturing dye.

DETAILED DESCRIPTION OF THE INVENTION

This invention is characterized by a reactive black dye which is combined with compounds having acetoxyethylsulfone group of the following formula 1:

Formula 1

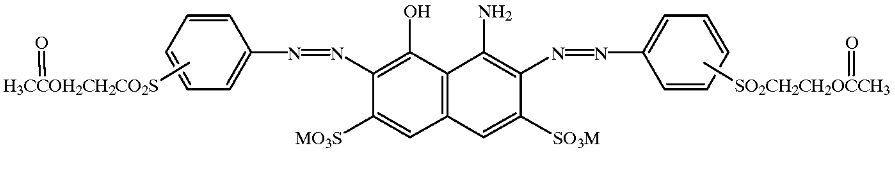

wherein M is an alkaline metal atom.

This invention is described in more detail as follows:

The reactive black dyes having acetoxyethylsulfone group of the above formula 1 according to this invention may be prepared in various synthesizing methods according to the kind of starting material used. For example, the following Scheme2 shows the preparing method of a reactive black dye with using aminophenyl-β-acetoxyethylsulfone as a starting material and the following Scheme3 shows another method with using aminophenyl-β-hydroxyethylsulfone as a staring material.

According to the following Scheme2, the reactive black dye is prepared by (a) diazotizing aminophenyl-β-acetoxyethylsulfone compound; (b) neutralizing 1-naphtol-8-amino-3,6-disulfonic acid compound with acid group; and (c) mixing two reaction solutions prepared in the manners as defined in (a) and (b) at temperature 0–5° C. and stirring the mixture with adjusting the pH below 7 through adding acid.

Scheme 2

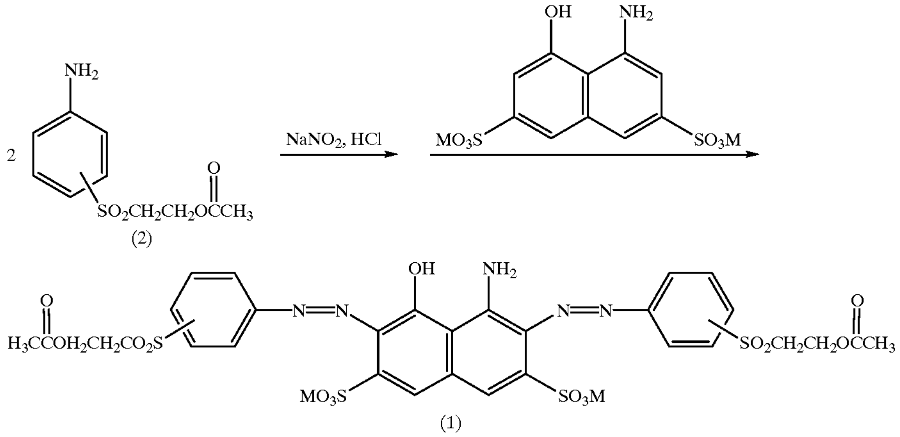

wherein M is an alkaline metal atom.

Hereunder, the preparation method according to the above Scheme2 is described more in detail.-

Aminophenyl-β-acetoxyethylsulfone of formula 2 is diazotized. The diazotization method adapted in this invention is conventional one, which means that after dispersing aminophenyl-β-acetoxyethylsulfone in water at 0–5° C., the diazotzation reaction is carried with adding conc. hydrochloric acid and $NaNO_2$.

And through neutralizing 1-naphthol-8-amino-3,6-disulfonic acid with using base in another reaction vessel, sulfonic acid group (—$SO_3H$) of 1-naphthol-8-amino-3,6-disulfonic acid is transformed into sulfonic acid metal salt (—$SO_3M$). The bases conventionally used in this reaction are alkaline metal hydroxide and alkaline metal carbonate salt and preferably NaOH, LiOH, $Na_2CO_3$ and $Li_2CO_3$ are used. The amount of base is determined by equivalent rate to the amount of 1-naphthol-8-amino-3,6-disulfonic acid.

After the reaction, the neutralized solution of 1-naphthol-8-amino-3,6-disulfonic acid is cooled down below 5° C. with ice, which is to carry out the coupling reaction with diazo compound at 0–5° C.

After mixing the above diazo compound and the neutralized solution of 1-naphthol-8-amino-3,6-disulfonic acid and adding base, the reaction solution is stirred at below pH 7 at 0–5° C. and resulted in reactive black dye of above formula 1. The amount of diazo compound is preferable 2–3 equivalent weight rate to 1-naphthol-8-amino-3,6-disulfonic acid. If the amount get out of the scope, side reaction may be occurred. If the pH of reaction solution exceeds 7, there is a problem in that the reaction group is hydrolyzed. If the reaction temperature becomes below 0° C., the reaction is not occurred satisfactorily and in the case of exceeding 5° C., side reaction may be occurred.

Aminophenyl-β-acetoxyethylsulfone of the above formula 2, which is used as a starting material in the above Scheme2 is prepared by reacting acetaminophenyl-β-hydroxyethylsulfone with acetic acid solution containing hydrochloric acid.

With the preparation method according to the above Scheme2, wherein aminophenyl-β-acetoxyethylsulfone compound of the above formula 2 is used as a starting material, bright colored and high purity dyes can be synthesized which cannot be acquired with aminophenyl-β-sulfatoethylsulfone.

Particularly, aminophenyl-β-acetoxyethylsulfone of formula 2 has no sulfonic acid group (—$SO_3H$), which existed in aminophenyl-β-sulfatoethylsulfone of formula 3, so that the amount of alkali used in neutralization for coupling reaction can be reduced. Furthermore, in comparison with the conventional method of following formula 4, in which aminophenyl-β-sulfatoethylsulfone of formula 3 is used, the preparation method according to Scheme2 with aminophenyl-β-acetoxyethylsulfone of formula 2 as a starting material has little amount of by product and it is advantageous in obtaining bright colored dye just with spray-drying the reaction solution.

In isolation process of dye, salting-out is impossible due to the high degree of water solubility of dye of formula 4 but this invention make it possible to obtain pure dye of high degree of concentration, which contain small amount of salt and by product with salting-out isolation process of reactive black dye of formula 1 according to this invention.

Formula 4

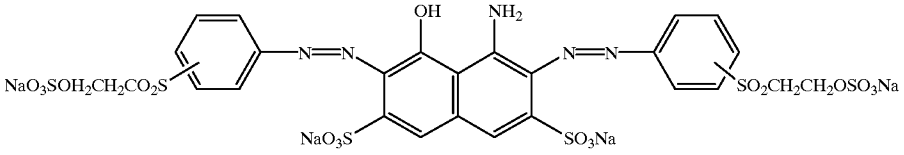

Another method for preparing a reactive black dye of formula 1 according to the invention is defined in the following Scheme3.

According to the following Scheme3, the reactive black dye of formula 1 is prepared by (a) diazotizing aminophenyl-β-hydroxyethylsulfone compound; (b) neutralizing 1-naphtol-8-amino-3,6-disulfonic acid compound with acid group; (c) mixing two reaction solutions prepared in the manners as defined in (a) and (b) at 0–5° C. and stirring the mixture with adjusting the pH below 7 through adding acid; and (d) dissolving the intermediate of formula 6 prepared in the manners of (a), (b) and (c) with anhydrous acetic acid and stirring the solution at 80–90° C.

Scheme 3

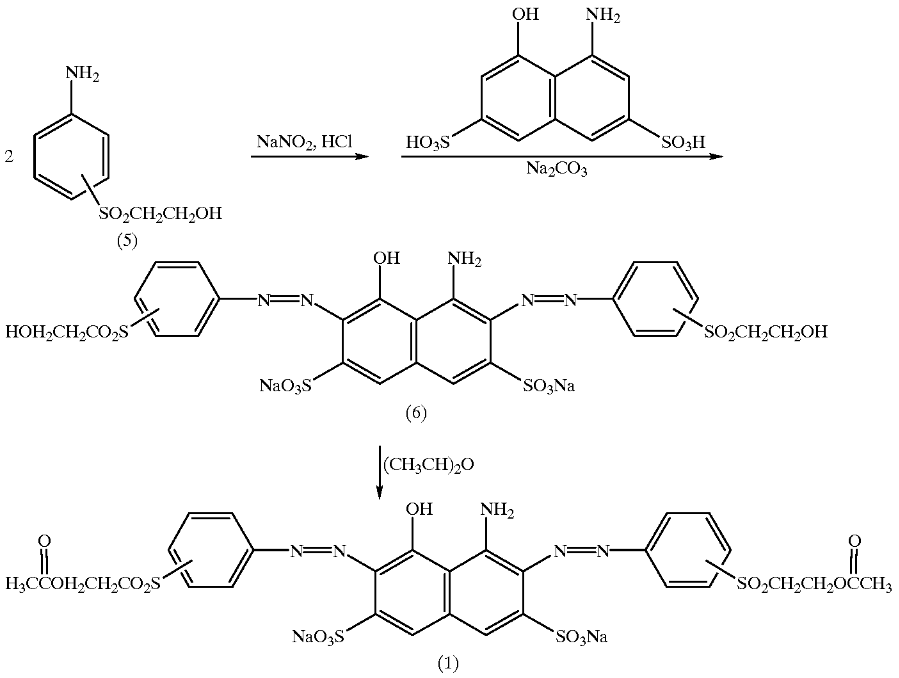

But the preparation method of Scheme3 has a problem that small amount of red by-product are made during the reaction and the intermediate of formula 6 should be reacted with anhydrous acetic acid after completely dried.

The reactive dye according to the invention is distinguished by high degree of fastness in case of dyeing to fabrics such as cotton, wool and silk. Further, the reactive black dye of formula 1 shows better color yield, fixation and fastness than the dye of formula 4.

The following specific examples are intended to be illustrative of the invention and should not be construed as limiting the scope of the invention as defined by appended claims.

Manufacturing Example: Preparation of 4-aminophenyl-β-acetoxyethylsulfone

After attaching condenser with rubber balloon to reaction vessel of 100 ml, 60 g (1 mol) of acetic acid and 1.8 g (0.1 mol) of water are put into it. With maintaining the reaction solution at 15° C., 5.5 g (0.15 mol) of hydrogen chloride gas is added slowly for 1.5 to 2 hours. After adding 24.3 g (0.1 mol) of 4-acetaminophenyl-β-hydroxyethylsulfone, the solution, whose temperature is slowly raised to 70~75° C. is stirred for 9 hours.

Then the solution is cooled down to room temperature with slow stirring, filtered and rinsed twice with acetic acid (5 ml). After drying the filtered solid at 60° C. in vacuum and dispersing it at 10 g of ice and 25 ml of water, this solution is neutralized with 10% of sodium carbonate solution and filtered the crystals. With rinsing with water (5 ml) three times and drying, white pure 20.6 g of 4-aminophenyl-β-acetoxyethylsulfone (yield 84.8%, purity 97.5%) in solid type is obtained. melting point: 92–93° C.

EXAMPLE 1

3N $NaNO_2$ (40 ml, 0.12 mol) is added to the dispersed solution of 26.76 g (0.11 mol) 4-aminophenyl-β-acetoxyethylsulfone and 200 ml of water, with maintaining the temperature at 0–5° C. and 90 g of ice is added; this is followed by the addition of 24 ml (0.276 mol) of 35% HCl and and diazotization. The diazotization is completed and excess nitrous acid is then destroyed by means of sulfamic acid.

15.97 g (0.05 mol) of 1-naphthol-8-amino-3,6-disulfonic acid is dissolved in 200 ml of water, neutralized with 2.0 g (0.05 mol) of NaOH and is cooled down to 0–5° C. The diazotized solution is added at once to 1-naphthol-8-amino-3,6-disulfonic acid neutralization solution and then it is reacted with maintaining pH below 7 by means of slow addition of NaOH solution. In the middle of reaction, 30 g of ice is added three times in order to prevent the raise of temperature. The reaction is ended after 4 hours of stirring and then reactive dyes is obtained by spray-drying.

$^1$H-NMR(300 MHz, DMSO-$d_6$): δ1.75(3H, s), 1.77(3H, s), 3.73(2H, t), 3.79(2H, t), 4.28(4H, q), 7.42(1H, s), 7.48 (1H, s), 7.92(2H, d), 8.00(2H, d), 8.03(2H, d), 8.26(2H, d), 10.41(1H, s), 10.61(1H, s), 15.36(1H, s)

EXAMPLE 2

An intermediate is prepared by coupling reaction in the same manner of Example 1 except using 4.06 g of 4-aminophenyl-β-hydroxyethylsulfone instead of 4-aminophenyl-β-acetoxyethylsulfone. After adding 20 ml anhydrous acetic acid to 1 g of dried intermediate, it is reacted for 8 hours at 80–90° C. and resulted in reactive black dyes.

EXAMPLE 3

3-aminophenyl-β-acetoxyethylsulfone is dispersed with 120 ml of water and 19.0 ml (0.22 mol) of 35% HCl is added. The temperature is maintained at 0~5° C. and then 60 g of ice is added. The solution is diazotized by means of addition of 3N NaNO2 (40 ml, 0.12 mol). The diazotization is completed and excess nitrous acid is then destroyed by means of sulfamic acid.

15.97 g (0.05 mol) of 1-naphtol-8-amino-3,6-disulfonic acid is dissolved in 120 ml of water, neutralized with 2.0 g (0.05 mol) of NaOH and cooled down to 0–5° C. The diazotized solution is added at once to 1-naphthol-8-amino-3,6 -disulfonic acid neutralization solution and then it is reacted with maintaining pH below 7 by means of slow addition of NaOH solution. In the middle of reaction, 25 g of ice is added three times in order to prevent the raise of temperature. The reaction is ended after 4 hours of stirring and then reactive black dye is obtained by salting-out and filtering.

$^1$H-NMR(300 MHz, DMSO-$d_6$): δ1.75(3H, s), 1.76(3H, s), 3.78(2H, t), 3.82(2H, t), 4.30(2H, t), 4.32(2H, t), 7.41(1H, s), 7.48(1H, s), 7.66–7.81(3H, m), 7.92(1H, d), 8.27(1H, d), 8.29(1H, s), 8.37(1H, d), 8.61(1H, s), 10.37(1H, s), 10.49 (1H, s), 15.47(1H, s)

Experimental Example

The reactive black dye prepared by the above Example 1 is used for exhaust-dyeing the fabrics such as cotton, wool and silk. After dyeing the fabrics in line with Remazol Black B (formerly Reactive Black 5) and absorbency, it is compared with those dyed with Remazol Black B.

Dyeing Method of Cotton Fabric 0.02 g (1.0% o.w.f dyeing) and 0.04 g(2.0% o.w.f. dyeing) of each reactive black dye obtained from the above Example 1–2 and 0.06 g(3.0% o.w.f. dyeing) of Remazol Black B are dissolved in 25 ml of water; to this solution 2 g of cotton fabric is introduced at 30° C. and 0.75 g of sodium sulfate is added. The temperature is raised then to 50° C. and 0.5 g of sodium carbonate is added. Dyeing is carried for 60 minutes and rinsed with cold water. The fabric is soaped off at 98° C. for 20 minutes, is rinsed once more and is dried.

Dyeing Method of Wool Fabric

To 0.01 g (1.0% o.w.f. dyeing) of reactive black dye obtained from the above Example 1 and Remazol Black B, 3 ml of buffer solution of pH 5 and water is added to make 30 ml of salt solutions 1 g of wool fabric is introduced to this solution and dyed for 60 minutes at 95° C. The fabric is then rinsed with cold water, is soaped off at 98° C. for 20 minutes, is rinsed once more and is dried.

Dyeing Method of Silk Fabric

To 0.01 g(1.0% o.w.f. dyeing) of reactive black dye obtained from the above Example 1 and Remazol Black B, 3 ml of buffer solution of pH 7, 0.6 g of sodium sulfate and water are added to make 20 ml of salt solution. 1 g of silk fabric is introduced to this solution and dyed for 60 minutes at 85° C. The fabric is then rinsed with cold water, is soaped off at 90° C. for 20 minutes, is rinsed once more and is dried.

When applied to cotton fabric, the reactive black dye of formula 1 according to the invention shows excellent dyeing levelness and reproducibility. And in comparison with Remazol Black B of formula 4, it shows almost same degree of color yield, fixation and superior light fastness (Dye of this invention: 4.5, Remazol Black B: 4). In other fastness, it shows similar properties. Dye of formula 1 synthesized according to Example 2 dyes fabric in red shade due to the red by-product produced during its synthesizing and its fixation value is 3% low than that of the dye prepared by the above Example 1 and its light fastness of 3.5 is also low.

When applied to wool fabric, the reactive black dyes according to the invention shows excellent dyeing levelness and reproducibility. And in comparison with Remazol Black B of formula 4, it shows superior color yield (Dye of this invention: 16.43, Remazol Black B : 13.51), fixation and light fastness (Dye of this invention: 4, Remazol Black B : 3). In other fastness, it shows similar properties.

When applied to silk fabric, reactive black dyes according to the invention shows excellent dyeing levelness and reproducibility. And in comparison with Remazol Black B of formula 4, it shows almost same degree of color yield and fixation and superior light fastness (Dye of this invention: 4, Remazol Black B: 3). In other fastness, it shows similar properties.

As described in the above, the reactive black dyes of this invention use aminophenyl-β-acetoxyethyl sulfone as reaction group instead of conventionally used aminophenyl-β-sulfatoethylsulfone, which can lessen the wastes in manufacturing. In particular, it shows bright color and superior light fastness to Remazol Black B.

What is claimed is:

1. A method for preparing a reactive black dye of formula 1, which comprises the steps of:

(a) diazotizing an aminophenyl-β-acetoxyethylsulfone compound of formula 2;

(b) neutralizing a 1-naphtol-8-amino-3,6-disulfonic acid compound with acid; and (c) mixing two reaction solutions prepared in the manners as defined in steps (a) and (b) at a temperature ranging from 0 to 5° C. and stirring the mixture with adjusting the pH below 7 through adding acid;

wherein said aminophenyl-β-acetoxyethylsulfone compound of formula 2 is chosen from

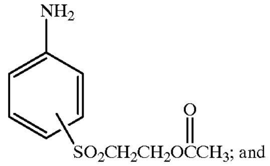

wherein said reactive black dye of formula 1 chosen from

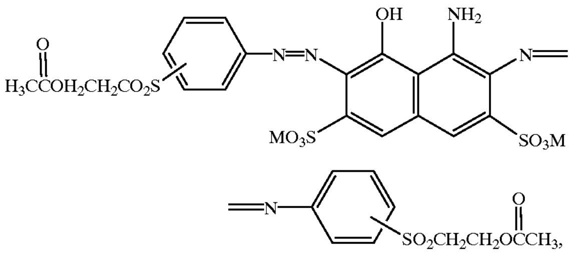

wherein M is an alkali metal atom.

2. A method for preparing a reactive black dye of formula 1, which comprises the steps of:

(a) diazotizing an aminophenyl-β-hydroxyethylsulfone compound of formula 5;

(b) neutralizing a 1-naphtol-8-amino-3,6-disulfonic acid compound with acid;

(c) mixing two reaction solutions prepared in the manners as defined in steps (a) and (b) at a temperature ranging from 0 to 5° C., stirring the mixture with adjusting the pH below 7 through adding acid and preparing an intermediate of formula 6; and (d) dissolving said intermediate of formula 6 with anhydrous acetic acid and stirring the solution at a temperature ranging from 80 to 90° C.;

wherein said aminophenyl-β-hydroxyethylsulfone compound of formula 5 is chosen from the meta- and para-isomers of

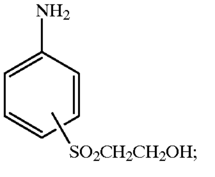

wherein said intermediate of formula 6 is chosen from

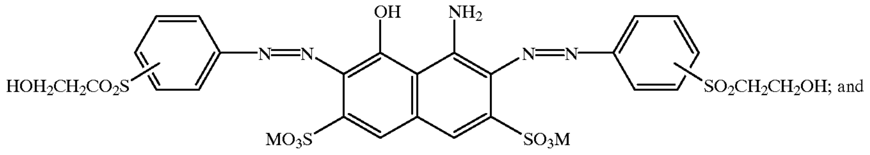
wherein said reactive black dye of formula 1 is chosen from
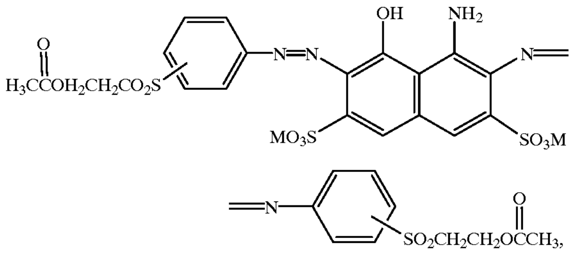
wherein M is an alkali metal atom.
* * * * *

UNITED STATES PATENT AND TRADEMARK OFFICE

CERTIFICATE OF CORRECTION

PATENT NO. : 6,326,474 B1
DATED : December 4, 2001
INVENTOR(S) : Sea Wha Oh et al.

It is certified that error appears in the above-identified patent and that said Letters Patent is hereby corrected as shown below:

Title page,
Item [22], change "Mar. 26, 1998" to -- Mar. 26, 1999 --

Signed and Sealed this

Eighteenth Day of June, 2002

*Attest:*

JAMES E. ROGAN

*Attesting Officer*

*Director of the United States Patent and Trademark Office*